United States Patent [19]

Bell et al.

[11] 4,197,513

[45] Apr. 8, 1980

[54] ACTIVE Q-SWITCHED HIGH POWER SINGLE MODE LASER

[75] Inventors: William A. Bell, Mountain View; Richard L. Herbst, Menlo Park, both of Calif.

[73] Assignee: Quanta Ray Inc., Mountain View, Calif.

[21] Appl. No.: 859,036

[22] Filed: Dec. 9, 1977

[51] Int. Cl.² ............................................. H01S 3/11
[52] U.S. Cl. ............................................. 331/94.5 Q
[58] Field of Search ................................ 331/94.5 Q

[56] References Cited

U.S. PATENT DOCUMENTS

| 3,521,069 | 7/1970 | DeMaria et al. | 331/94.5 Q |
| 3,836,866 | 9/1974 | Ammann et al. | 331/94.5 Q |

Primary Examiner—William L. Sikes
Attorney, Agent, or Firm—Harry E. Aine; Harvey G. Lowhurst

[57] ABSTRACT

A high power single mode laser is disclosed which includes a Q-switch for switching the laser on in two stages: firstly, to a relatively high loss level just above threshold where it is held to permit a train of relaxation oscillator spikes to be established and then it is switched to a second stage in which the Q-switch is in a lossless state to allow the resonant mode within the laser to build up to maximum power. An optical detector monitors the resonant optical radiation level within the optical resonator and produces an output signal for each of the relaxation spikes. A trigger circuit, responsive to the detected oscillator spikes, triggers the Q-switch so as to switch it to the second or lossless state upon receipt of the second or any other subsequent relaxation oscillator spike, whereby single longitudinal mode operation of the laser is enhanced. A pair of quarter wave plates are disposed on opposite sides of the laser gain medium within the optical resonator to make the power density distribution within the laser gain medium more uniform, thereby further enhancing single longitudinal mode operation. In a preferred embodiment, the trigger circuit includes a divider which is responsive to the detected oscillator spike signals and divides the received spike signals by two or more so that the laser is caused to fire upon initiation of the second or subsequent relaxation oscillator spike.

5 Claims, 4 Drawing Figures

U.S. Patent
Apr. 8, 1980
4,197,513
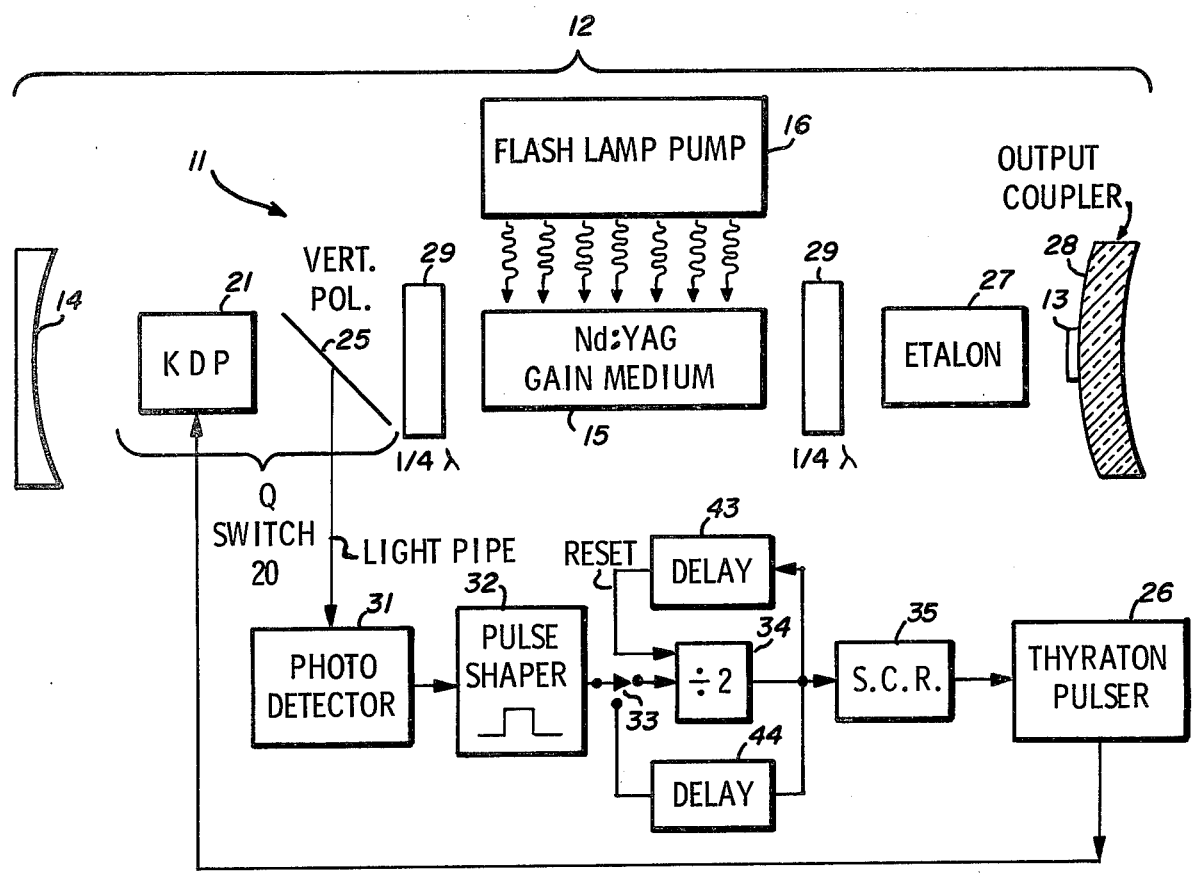
Fig_1
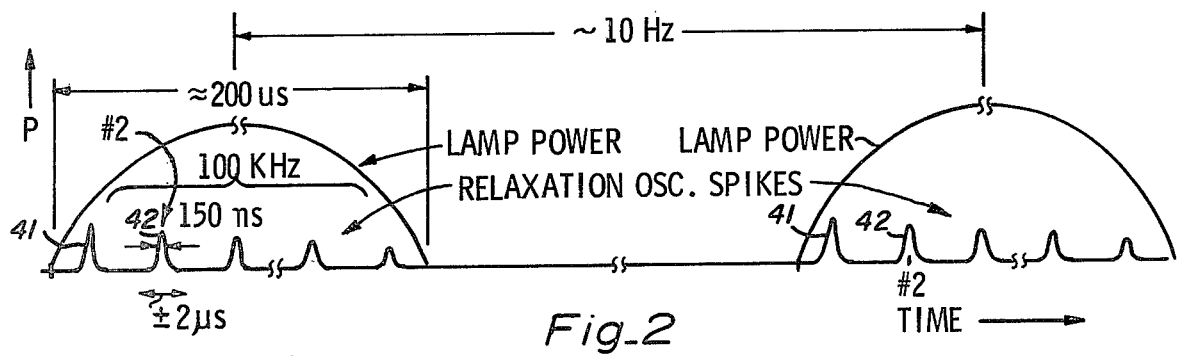
Fig_2
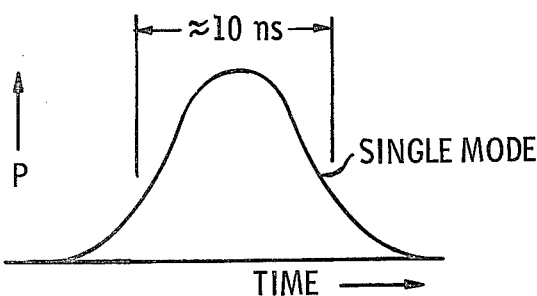
Fig_3
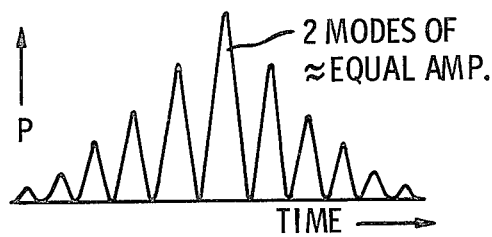
Fig_4

ACTIVE Q-SWITCHED HIGH POWER SINGLE MODE LASER

BACKGROUND OF THE INVENTION

The present invention relates in general to high power lasers and, more particularly, to an improved two step Q-switching technique for producing high power output in a single longitudinal mode.

DESCRIPTION OF THE PRIOR ART

Heretofore, it has been proposed to Q-swtich a high power laser in two steps so as to deliberately lengthen the build up time to allow more optical transmits through the mode selector within the optical resonator of the laser. The prior art utilized a Pockels cell Q-switch wherein the switching was in two stages; first to a level just above threshold where it was held until a single mode is established and then switched to a second stage in which the switch is completely open to allow this mode to build up to a maximum power. Utilizing a two plate resonant reflector i.e., an etalon, as a frequency selecting element within the resonator, single frequency $TEM_{00}$ power of 250 kilowatts was obtained from a flash pumped $Nd:CaWO_4$ laser, i.e., single longitudinal and transverse mode with an output power of 250 kilowatts. Such a laser is disclosed in an article titled "A Two-Step Q-Switching Technique for Producing High Power in a Single Longitudinal Mode" appearing in Volume 3 of Opto-Electronics, published in 1971 at pages 163—169. Similar disclosures are found in Electronics Letters of July 27, 1972, Volume 8 #15 in an article titled "Active Q-Switching Technique for Producing High Laser Power in a Single Longitudinal Mode" appearing in Volume 4 of Opto-Electronics, published in 1972 at pages 249–256, wherein the power within the optical resonator is monitored by means of a photocell and a Pockels cell Q-switch is initially opened to a relatively high loss condition for the first one thousand or so double passes of the light to and fro within the resonator and then the Q-switch is switched to the no loss state at a preset resonator power level.

In all of the aforecited prior art references, the second state of the Q-switching, which opens the Q-switch completely and allows the gain pulse to build up, occurs on the first relaxation oscillator spike. The problem with this arrangement is that in a high power high gain Nd:YAG laser this method does not work satisfactorily for attaining single longitudinal mode operation.

SUMMARY OF THE PRESENT INVENTION

The principal object of the present invention is the provision of an improved Q-switching technique for producing high laser power in a single longitudinal mode.

In one feature of the present invention, the laser power is monitored while a Q-switch is operating in a first or relatively lossy state just above threshold and a detector detects the resultant relaxation oscillator spikes and a trigger circuit is responsive to the detected relaxation oscillator spikes for triggering open the Q-switch to a lossless state in response to a plurality of relaxation oscillator spikes, whereby operation of the high power laser in a single longitudinal mode is enhanced.

In another feature of the present invention, the trigger circuit includes a divider responsive to the output of the detector for monitoring the power of the laser so that the trigger causes the Q-switch to switch into the low loss mode upon the receipt of the second or any subsequent relaxation oscillator spike.

In another feature of the present invention, a pair of quarter wave plates are disposed on opposite sides of the laser gain medium within the optical resonator so as to obtain a more uniform distribution of the power density within the laser gain medium, thereby further enhancing single longitudinal mode operation.

Other features and advantages of the present invention become apparent upon perusal of the following specification taken in connection with the accompanying drawings wherein:

BRIEF DESCRIPTION OF THE DRAWINGS

FIG. 1 is a longitudinal schematic diagram, partly in block diagram form, of a laser incorporating features of the present invention, FIG. 2 is a plot of pump flash lamp output power and laser output power versus time depicting the relaxation oscillator spikes as a function of the pumping lamp power, FIG. 3 is a plot of laser output power versus time depicting single longitudinal mode operation, and FIG. 4 is a plot similar to that of FIG. 3 depicting simultaneous operation on two longitudinal modes of approximately equal amplitude.

DESCRIPTION OF THE PREFERRED EMBODIMENTS

Referring now to FIG. 1, there is shown a laser 11 incorporating features of the present invention. The laser 11 includes an optical resonator 12 defined by the region between the output mirror 13 and another end mirror 14. The spacing between the first and second mirrors 13 and 14 is adjusted to take into account the optical characteristics of all of the optical elements disposed within the optical resonator 12.

A laser high gain medium 15, such as neodymium doped yttrium-aluminum garnet (Nd:YAG) is disposed on the optical axis of the resonator 12 for providing optical gain for the laser. A flash lamp 16, such as a pair of Xenon flash lamps, is disposed within a pair of ellipitcal reflectors and serves to irradiate the laser gain medium 15 with optical energy for pumping the laser gain medium 15 to a population inversion of the lasing transitions.

A Q-switch 20 is disposed within the optical resonator 12 on the optical axis thereof. The Q-switch 20 serves as a fast acting switch for pulsing the laser on and off. In a preferred embodiment, the Q-switch 20 comprises a KD*P crystal 21 having a pair of electrodes disposed on opposite ends thereof for applying an electrical potential thereacross so that when the potential, as of several KV, is applied across the KD*P crystal, the crystal serves to rotate polarization of the optical radiation within the resonator by approximately one-quarter of a wavelength for each round trip transmit through the KD*P crystal 21. A linear polarizer 25, such as a dielectric near Brewster angle polarizer, is associated with the KD*P crystal for polarizing the optical radiation in a first linear direction, such as in the vertical direction. The electrical potential is applied across the KD*P crystal from a pulser 26, such as a thyratron. In the zero bias state, i.e., no voltage applied across the KD*P crystal, the crystal 20 does not rotate the polarization of the linearly polarized optical radiation and the Q-switch 20 is thus in no loss state. With 3250V bias applied across the KD*P crystal 21, the crystal 20 rotates the round trip polarization by 90° thus providing total loss or 100% reflectivity from the polarizer 25. The high loss bias potential to provide threshold oscillation is about 2800V providing about 60% to 70% reflectivity or loss.

A tilted etalon 27 is disposed on the optical axis of the resonator 12 for providing a bandpass filter at the desired operating optical wavelength of the resonator. The output mirror 13 is supported from the center of a meniscus lens 28 by being deposited in the center thereof. The mediscus lens 28 also serves as the output coupler for coupling output optical radiation from the resonator 12.

The optical resonator 12 is designed as an unstable resonator, i.e., a ray slightly off the optical axis of the resonator 12 traces a reflective path back and forth between the mirrors 13 and 14 which begins near the axis of the resonator and moves to the outside of the resonator, thereby producing a power flow in the resonator which moves radially outward from the optical axis of the resonator. In this manner, the optical energy is coupled by diffraction from the resonator 12 around the outer periphery of the output mirror 14.

In addition, the curvatures of the two mirrors 13 and 14 and the focal properties of the various elements within the resonator 12, especially including the thermal focusing properties of laser gain medium 15, are arranged so that the output light beam, at the plane of the output mirror 13, is collimated, i.e., the beam is neither diverging or converging in the region of the beam at the output mirror 13. This is accomplished in the preferred embodiment of the present invention, as illustrated in FIG. 1, by designing the optical resonator 12 taking into account the thermal focusing properties of the laser gain medium 15 so that the optical resonator is a confocal resonator, i.e., the foci of the two mirrors, including the positive focusing effect of the laser gain medium 15 occur at the same point outside of the optical resonator 12. Such a laser is commercially available from QuantaRay, Inc. of Mountain View, Ca.

A pair of quarter wave plates 29 are disposed on opposite sides of the laser gain medium 15 inside the optical resonator 12 for splitting the optical waves traveling into the gain medium 15 into a pair of orthogonally polarized waves, one of which is delayed 90° in phase relative to the other. The split wave energy traveling out of the laser gain medium in either direction as it passes through the respective quarter wave plate is recombined into a single wave of vertical polarization. The advantage of the quarter wave plates is to obtain a more uniform distribution of the laser power density within the laser gain medium so that a spatial distribution of energy within the laser gain medium does not contribute to initiation of oscillation on undesired competing modes. This enhances single mode operation.

The optical power within the resonator 12 is monitored by a photodetector 31 coupled to the resonator 12 via a light pipe which guides light reflected from the vertical polarizer 25 into the light pipe to the photodetector 31. A suitable photodetector 31 is a EG and G photodetector having an output of approximately 2 volts with pulses having fifty to one hundred watts peak power and a width of one hundred fifty nanoseconds. The output of the photodetector is fed to a pulse shaper 32 such as a Schmidt trigger and the output of the pulse shaper is fed via a switch 33 to one of two outputs.

In a first output position, the output of the pulse shaper 32 is fed via switch 33 to the input of a divider 34 which, in a preferred embodiment, divides by two such that the divider produces an output upon receipt of the second output pulse of the pulse shaper 32. The output of the divider is fed to a silicon controlled rectifier 35 which fires the thyratron pulser 26 for switching the Q-switch 20 to a low loss mode to a fully open state. The Q-switch is normally biased via a bias voltage to a voltage sufficient to produce sufficient loss in the optical resonator 12 so that in the high loss condition relaxation oscillator spikes are observed, i.e., a voltage of 2800 V to produce between 60% and 70% loss. More particularly, and referring to FIG. 2, there is shown the power output of the laser versus time when the laser is operating in the relaxation oscillator spike mode, i.e., when the Q-switch is in the 60% to 70% loss strate. In this state, the lamp power is applied over a pulse length of approximately 200 microseconds at a pulse repetition rate of approximately 10 Hz. The resonant optical energy builds up in the optical resonator 12 and initiates a train of relaxation oscillator spikes, each spike having a width of approximately 150 nanoseconds at a pulse repetition rate of approximately 100 kilohertz. The relaxation oscillator spikes have a jitter of approximately plus or minus 2 microseconds. The train of relaxation oscillator spikes follows application of the lamp power and they continue throughout the duration of the lamp power pulses.

It has been found, utilizing the laser system of FIG. 1, that when the thyratron pulser 26 is triggered when the first relaxation oscillator spikes 41 in each train reaches a certain amplitude, after the teachings of the prior art, that quite often the laser does not operate on a single longitudinal mode.

We have found, however, that stable single mode laser operation may be obtained in the laser system of FIG. 1 by triggering the Q mode switch not on the first relaxation oscillation spike 4 but on the second 42 or any subsequent one of the relaxation oscillator spikes. Accordingly, the divider 34 provides a relatively simple mechanism for sensing the second or any subsequent one of the relaxation oscillator spikes and initiating the pulser for opening the Q-switch allowing the laser to produce a giant output pulse. A delay 43 is provided between the output of the divider 34 and the reset terminal of the divider so that the divider is only reset for the next lamp power pulse and will not fire again during a single lamp power pulse.

As an alternative to the divider 34, the switch 33 may be set to connect a delay 44 to the output of the pulse shaper 32, such delay being of a proper amount so that the SCR 35 and thyratron pulser 26 are pulsed at the time of the expected second relaxation oscillator spike 42. This delay would be on the order of the time equal to 1 over the relaxation oscillator pulse repetition rate. In this alternative embodiment, the pulse shaper 32 has a built-in delay such that the pulse shaper would not respond to receipt of a second detected relaxation oscillator spike until after the aforecited delay corresponding to the time of delay 43 had been obtained.

Referring now to FIG. 3, there is shown a giant output pulse produced by the laser 11 incorporating the trigger circuit of the present invention for firing the laser on the second or subsequent relaxation oscillator spikes. The output pulse is seen to be without modulation which corresponds to single longitudinal mode operation. In a typical example, the output pulse is on the order of ten nanoseconds long.

Referring now to FIG. 4, there is shown an output pulse of a laser similar to that of FIG. 1 firing on the first relaxation oscillator spike 41 and depicting two competing modes of oscillation each of approximately equal amplitude which produces almost 100% modulation depths of the output power during the pulse width. As used herein, single mode operation is defined as the situation where one mode is ten times greater in intensity than any other.

In a typical example of the laser 11, the laser gain medium 15 comprises a lightly doped Nd:YAG rod as of 6.3 millimeter diameter and doped to a doping of between 0.5% and 0.8% Nd by atomic weight. The rod has a length greater than 2 inches and approximately 2 inches of its length is pumped by means of the high intensity Xenon flash lamps 16 having an average input power of approximately 800 watts. The ends of the laser rod 15 are inclined at an angle of approximately 1° out of perpendicular relative to the optical axis of the resonator 12 and are parallel to prevent setting up of undesired multiple reflections internally of the rod. The Xenon flash lamps 16 have elliptical reflectors coated with gold or silver. The linear polarizer 25 comprises a dielectric which is commercially available from CVI Laser Co. of Albuquerque, New Mexico. The KD*P crystal 21 has a diameter greater than the diameter of the laser rod 15 and preferably comprises a deuterated potassium dihydrogen phosphate crystal commercially available from Laser Metrics, Inc. of N.J. The back resonator mirror 14 is concave having a high reflectivity coating formed by a multiple layer dielectric coating on a fused silica substrate to provide greater than 90% reflectivity at a wavelength of interest of the operating wavelength of the resonator 12. Suitable mirrors are commercially available from Coherent Radiation, Inc. of Palo Alto, Ca. The diameter of the back resonator mirror 14 is preferably much greater than the diameter of the laser rod 15 and, in a typical example, is approximately 1.0 inch in diameter.

The line narrowing element, such as the tilted etalon 27, is designed for a narrow passband width between 0.1 and 0.5 wave numbers. In a preferred embodiment it has a bandpass wavelength centered at 1.064 micrometers. A suitable tilted etalon is commercially available from Coherent Radiation, Inc. of Palo Alto, Ca. Laser 11 preferably has a resonator magnification M falling within the range of 2 to 5 where the magnification M is defined as the ratio of the diameter of the laser rod 15 to the diameter of the output mirror 13. In a preferred embodiment, the magnification M is 3.55. The geometrical output coupling coefficient is defined by the expression $\sigma = 1 - 1/M^2$.

The output beam pattern comprises a 6.3 millimeter diameter spot with a 1.8 millimeter diameter hole. In the far field, the beam converts to a modified airy disc pattern with the fraction of energy in the central lobe equal to the fractional output coupling.

The flash lamp 16 is typically operated with a pulse length of approximately 200 microseconds to deliver between 20 and 70 Joules of energy to the laser rod with a pulse repetition rate of approximately 10 Hz. The laser is Q-switched on to dump the energy stored in the laser gain medium into the output laser beam. The aforementioned laser has operated with up to 250 mJ energy per output beam pulse of a width of approximately 10 nanoseconds. This corresponds to a peak power outside of the optical resonator 12 of 25 megawatts and to 75 megawatts per square centimeter. Circulating power density inside the resonator 12 is approximately 100 megawatts per square centimeter.

The advantage of single longitudinal mode operation is that the shape of the pulse is well defined and this is important for use in nonlinear optics. The peak amplitude of the single mode pulse is readily detected and this is important for damage studies requiring good pulse shape. In addition, the spectral shape of the output pulse is much narrower, that is the line width is proportional to one over the pulse width.

What is claimed is:

1. In a laser:

optical resonator means for excitation with optical radiation for exciting electromagnetic resonance of said resonator means at a resonant optical wavelength;

laser gain medium means for disposition within said optical resonator means for providing gain to the electromagnetic energy within said optical resonator means at said resonant optical wavelength;

Q-switch means for disposition within said optical resonator means and responsive to a pulsed switch input for providing switchable loss to the electromagnetic energy at said resonator optical wavelength within said optical resonator means, said Q-switch means being switchable in response to said pulsed switch input between first and second loss states, said first loss state being substantially more lossy to the optical resonant radiation than said second loss state for pulsing the effective gain of the laser and thus for pulsing the resonant optical excitation of said resonator;

pump means for pumping said laser gain medium means with energy to put said laser gain medium into a pumped state so that said pumped laser gain medium means is capable of converting pump energy to otpical energy at the resonant optical wavelength of said resonator means;

said first lossy state of said Q-switch means being of sufficient loss such that said pumped laser gain medium converts sufficient pump energy to the resonant optical radiation within said optical resonator means to initiate a train of relaxation oscillator pulses of resonant optical radiation within said optical resonator means;

detector means responsive to a first one of said relaxation oscillator pulses for generating said pulsed Q-switch input for switching said Q-switch means from said first lossy state to said second loss state while said laser gain medium is in a pumped state and while a subsequent second relaxation oscillator pulse of said optical radiation is present for pulsing on the resonant optical excitation of said optical resonator means and producing a giant output pulse, whereby single longitudinal mode operation of the laser is enhanced; and said detector means being responsive to individual ones of said relaxation oscillator pulses for generating a detector output signal in response to individual relaxation oscillator pulses, and including pulsing means responsive to a predetermined number of said detector output signals for generating said pulsed Q-switch input, whereby said Q-switch means is switched in response to detection of a plurality of said relaxation oscillator pulses.

2. The apparatus of claim 1 wherein said pulsing means is responsive to the receipt of the second detector output signal such that said Q-switch means is caused to be switched in response to the detection of said second relaxation oscillator pulse.

3. The apparatus of claim 1 wherein said detector means includes, photodetector means disposed externally of said optical resonator means and responsive to the resonant optical radiation to derive an output signal, and light pipe means for disposition to receive resonant optical radiation emanating from within said optical resonator and for guiding said received optical radiation to said photodetector.

4. In a laser:
optical resonator means for excitation with optical radiation for exciting electromagnetic resonance of said optical resonator means at a resonant optical wavelength;
laser gain medium means for disposition within said optical resonator means for providing gain to the electromagnetic energy within said optical resonator means at said resonant optical wavelength;
Q-switch means for disposition within said optical resonator means and responsive to a pulsed switch input for providing switchable loss to the electromagnetic energy at said resonator optical wavelength within said optical resonator means, said Q-switch means being switchable in response to said pulsed switch input between first and second loss states, said first loss state being substantially more lossy to the optical resonant radiation than said second loss state for pulsing the effective gain of the laser and thus for pulsing the resonant optical excitation of said resonator;
pump means for pumping said laser gain medium means with energy to put said laser gain medium into a pumped state so that said pumped laser gain medium means is capable of converting pump energy to optical energy at the resonant optical wavelength of said resonator means;
said first lossy state of said Q-switch means being of sufficient loss such that said pumped laser gain medium converts sufficient pump energy to the resonant optical radiation within said optical resonator means to initiate a train of relaxation oscillator pulses of resonant optical radiation within said optical resonator means;
detector means responsive to a first one of said relaxation oscillator pulses for generating said pulsed Q-switch input for switching said Q-switch means from said first lossy state to said second loss state while said laser gain medium is in a pumped state and while a subsequent second relaxation oscillator pulse of a said optical radiation is present for pulsing on the resonant optical excitation of said optical resonator means and producing a giant output pulse, whereby single longitudinal mode operation of the laser is enhanced; and
said laser gain medium comprising a solid laser gain medium and including first and second quarter wave plate means for disposition within said optical resonator means on opposite sides of said laser gain medium means for dividing each of the oppositely running optical resonant waves within said laser gain medium into a pair of running waves one delayed with respect to the other wave within said laser gain medium whereby a more uniform spatial distribution of power is attained within said laser gain medium, and whereby single mode operation is enhanced.

5. The apparatus of claim 4 wherein said laser gain medium is a neodymium doped yttrium-aluminum garnet.

* * * * *